May 27, 1924.                                                            1,495,280
E. VONNEZ ET AL
VEHICLE BRIDGE WITH MOVABLE REAR PART
Original Filed March 11, 1921
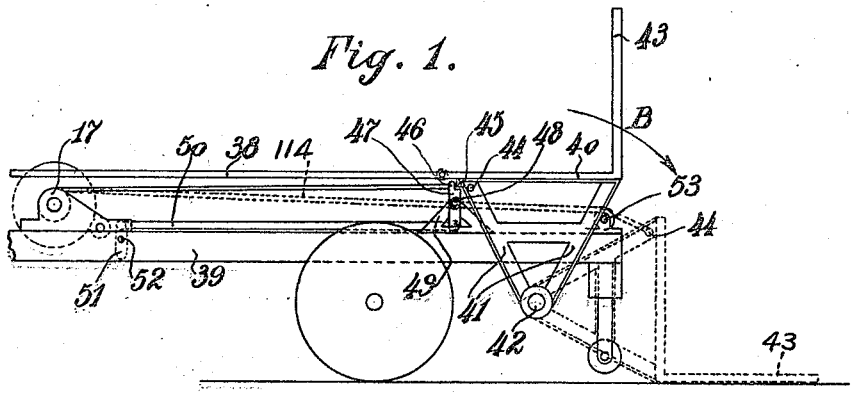
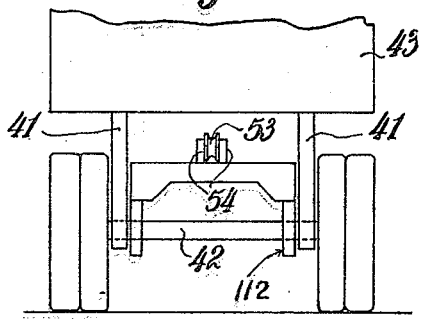
Inventors
E. Vonnez
C. Jaquemot
by Langner, Parry, Card & Langner
Att'ys.

Patented May 27, 1924.

1,495,280

UNITED STATES PATENT OFFICE.

EUGÈNE VONNEZ AND CHARLES JAQUEMOT, OF GENEVA, SWITZERLAND.

VEHICLE BRIDGE WITH MOVABLE REAR PART.

Original application filed March 11, 1921, Serial No. 451,430. Divided and this application filed November 15, 1922. Serial No. 601,116.

*To all whom it may concern:*

Be it known that we, EUGÈNE VONNEZ and CHARLES JAQUEMOT, both citizens of the Confederation of Switzerland, residing at Geneva, Canton of Geneva, Confederation of Switzerland, have invented certain new and useful Improvements in Vehicle Bridges with Movable Rear Parts, of which the following is a specification.

The object of this invention is to provide a vehicle having a loading bridge which is provided with a revolvable rear part whereby to facilitate the loading and unloading of goods.

This application is a division of applicants' copending application filed Mar. 11, 1921, Serial No. 451,430.

The attached drawing shows by way of example one constructional form of the invention.

Figs. 1 and 2 are, respectively, a side view, and an end view, of the device according to invention.

According to Figs. 1 and 2 the illustrated embodiment of the invention comprises a loading bridge 38 carried by the frame 39 of an automobile vehicle, said bridge being provided at its rear part with a movable loading member 40 carried by supports 41, and adapted to oscillate on a shaft 42 arranged in bearings 112 placed on the lower part of the frame (Fig. 2). Said movable member 40 has, on its rear extremity, a vertical wall or frame work 43. Its front end is provided with a bar 44 to which one end of a rope 114 is attached the other end being connected to a winch 17 (Fig. 1) whereby, when the movable member 40 is in the position in which its platform constitutes a rear prolongation of the bridge 38 proper, the rope 114 is stretched tautly. The front part of said movable member 40 is provided with an abutment 45, which, when member 40 is fully raised by means of the winch 17 and rope 114, strikes against a nose 46 of a bar 47 mounted upon a shaft 48 carried by supports 49 fixed to the frame 39. The lower end of the bar 47 is connected, by means of a rigid rod 50, to the upper end of a bar 51 oscillating on a shaft 52. The lower end of bar 51 is in any known manner connected to a device, (not shown) for throwing the winch out of gear (Fig. 1). The frame 39 carries a grooved roller 53, on supports 54. The rope 114 is guided in the groove or roller 53 whenever the movable member 40 is lowered to the ground or is raised into its horizontal position (Fig. 1).

The device is operated as follows:—

If the movable member 40 is in the position shown in full lines, in Fig. 1, and the winch 17 is thrown into gear, it will move in such a direction as to uncoil the rope 114 so that the movable member 40 due to its weight, describes an arc of a circle about its shaft 42 as indicated by arrow B in Fig. 1. At the end of its course the wall or frame 43 comes to rest upon the ground and the winch is stopped in any desired manner. The goods or parcels which are to be conveyed by the automobile are then placed upon the wall or frame 43. This done the winch 17 is started again and caused to rotate in a direction opposite to that when uncoiling the rope 114. The latter now being wound up, the member 40 and the goods loaded on the wall or frame work 43 are smoothly lifted, and the goods, during the ascending motion of the member 40 are shifted by their own weight from the wall 43 onto the platform of the latter which at the end of its travel is on the same horizontal plane as, and constitutes a portion of, the bridge proper 39. After the goods or parcels are distributed on the front part of the bridge 39 the manipulation described may be repeated until the bridge 39 is completely loaded.

It is evident that for unloading, the goods are shifted from the front part of the bridge onto the platform of the revolvable rear part and the latter is lowered as in the former case for loading.

The abutment 45 on the front end of the movable part 40 will, whenever the member 40 is brought again to its initial position as in Fig. 1, strike against the nose 46 of the bar 47. By the intermediary of the rod 50 fixed on its other end to the bar 51, a device (not shown) for throwing the winch 17 out of gear, is operated. The action of the winch 17 upon the rope 114 connected to the movable member 40 thereupon immediately ceases.

Having now described our invention, we declare that what we claim is:—

1. A loading device for vehicles, comprising, a loading platform positionable on a vehicle, an operating winch on the vehicle, a shaft arranged crosswise and beneath the vehicle, a loading member oscillable on said axle to a raised and a lowered position, a cable connecting the winch and the loading member, the loading member being so arranged, that in its raised position, it forms a tail board to the loading platform, and also forms a regular portion of the loading platform proper.

2. A device as in claim 1, the portion of the loading platform formed by the loading member, being the full width of, and level and continuous with, the platform proper.

In testimony whereof we have signed our names to this specification.

EUGÈNE VONNEZ.
CHARLES JAQUEMOT.

Witnesses:
MAURICE TUIES,
D. H. DUFOUR.